(12) United States Patent
Shea

(10) Patent No.: US 10,918,543 B2
(45) Date of Patent: Feb. 16, 2021

(54) TRACKED CHAIR

(71) Applicant: Joseph Shea, Clarks Summit, PA (US)

(72) Inventor: Joseph Shea, Clarks Summit, PA (US)

( * ) Notice: Subject to any disclaimer, the term of this patent is extended or adjusted under 35 U.S.C. 154(b) by 280 days.

(21) Appl. No.: 16/120,687

(22) Filed: Sep. 4, 2018

(65) Prior Publication Data
US 2020/0069487 A1   Mar. 5, 2020

(51) Int. Cl.
| | |
|---|---|
| *A61G 5/06* | (2006.01) |
| *A61G 5/04* | (2013.01) |
| *A61G 5/10* | (2006.01) |
| *B62D 55/06* | (2006.01) |
| *B62D 55/12* | (2006.01) |
| *A61G 5/12* | (2006.01) |
| *B62D 55/30* | (2006.01) |
| *B62D 55/10* | (2006.01) |

(52) U.S. Cl.
CPC ............. *A61G 5/066* (2013.01); *A61G 5/04* (2013.01); *A61G 5/107* (2013.01); *A61G 5/1089* (2016.11); *A61G 5/1091* (2016.11); *A61G 5/128* (2016.11); *B62D 55/06* (2013.01); *B62D 55/10* (2013.01); *B62D 55/12* (2013.01); *B62D 55/30* (2013.01)

(58) Field of Classification Search
CPC .... A61G 5/066; A61G 5/1089; A61G 5/1091; B62D 55/06
USPC .............................. 296/136.1, 136.11, 136.12
See application file for complete search history.

(56) References Cited

U.S. PATENT DOCUMENTS

| | | | | |
|---|---|---|---|---|
| 137,091 A * | 3/1873 | Parker | .................. | B60N 2/045 248/395 |
| 160,624 A * | 3/1875 | Spencer | ................. | A47C 3/027 248/395 |
| 1,970,577 A * | 8/1934 | Schauss | ............... | A47C 3/0257 297/329 |
| 2,195,428 A * | 4/1940 | Searing | .................. | B63B 29/12 114/194 |
| 2,313,023 A * | 3/1943 | Ruegger | ............. | A47C 3/0257 297/329 |
| 3,068,950 A * | 12/1962 | Davidson | ............... | A61G 5/061 180/9.23 |
| 3,999,799 A * | 12/1976 | Daswick | .............. | A47C 3/0257 297/270.3 |
| 4,077,483 A * | 3/1978 | Randolph | ............. | B62D 55/06 180/6.5 |
| 4,564,080 A * | 1/1986 | Pagett | .................... | A61G 5/061 180/8.2 |
| 4,585,241 A * | 4/1986 | Misawa | ................. | A61G 5/061 180/9.22 |
| 4,627,508 A * | 12/1986 | Auer | ..................... | A61G 5/061 180/8.2 |

(Continued)

*Primary Examiner* — Ruth Ilan
*Assistant Examiner* — Conan D Duda
(74) *Attorney, Agent, or Firm* — Mitchell A. Smolow

(57) ABSTRACT

A tracked powered chair is described. A side drive assembly comprises a powered sprocket, a forward non-powered two wheel bogey, and a rearward non-powered two wheel bogey. Each bogey has a respective pivot member pivotally fastened at a first pivot member end between the first and second bogey wheels, and a second pivot member end fastened to the frame such that the forward and rearward bogey each pivot independently from one another around its respective pivot member. The geometry of the drive assembly creates a non-isosceles shaped triangular appearance (no two sides are of equal length).

18 Claims, 6 Drawing Sheets

(56) References Cited

U.S. PATENT DOCUMENTS

| | | | | |
|---|---|---|---|---|
| 4,671,369 A * | 6/1987 | Tiffin | A61G 5/061 | 180/8.1 |
| 4,674,584 A * | 6/1987 | Watkins | A61G 5/061 | 180/8.2 |
| 4,687,068 A * | 8/1987 | Pagett | A61G 5/061 | 180/8.2 |
| 4,688,813 A * | 8/1987 | Misawa | A61G 5/061 | 180/8.2 |
| 4,709,960 A * | 12/1987 | Launes | A47D 1/002 | 297/256.13 |
| 4,750,478 A * | 6/1988 | Bergeron | A47C 7/425 | 128/870 |
| 4,771,839 A * | 9/1988 | Misawa | A61G 5/061 | 180/8.2 |
| 4,842,232 A * | 6/1989 | Pipon | B60N 2/0715 | 248/395 |
| 4,915,184 A * | 4/1990 | Watkins | A61G 5/061 | 180/8.2 |
| 4,941,709 A * | 7/1990 | Moller | A61B 6/04 | 297/311 |
| 4,957,302 A * | 9/1990 | Maxwell | A47C 3/0257 | 280/32.6 |
| 5,248,007 A * | 9/1993 | Watkins | A61G 5/061 | 180/169 |
| 5,249,838 A * | 10/1993 | Kulpa | A47C 1/026 | 248/371 |
| 5,333,887 A * | 8/1994 | Luther | A61G 5/006 | 280/250.1 |
| 5,366,277 A * | 11/1994 | Tremblay | A47D 15/006 | 297/440.13 |
| 5,641,030 A * | 6/1997 | Toselli | A61G 5/061 | 180/169 |
| 5,676,215 A * | 10/1997 | Misawa | A61G 5/061 | 180/9.52 |
| 5,785,384 A * | 7/1998 | Sagstuen | A47C 1/032 | 297/317 |
| 5,967,609 A * | 10/1999 | Potter | A47C 1/027 | 297/261.3 |
| 6,032,976 A * | 3/2000 | Dickie | A61G 5/00 | 180/65.6 |
| 6,050,642 A * | 4/2000 | Erb | A47C 1/032 | 297/259.2 |
| 6,056,363 A * | 5/2000 | Maddox | A47C 3/0257 | 297/115 |
| 6,076,619 A * | 6/2000 | Hammer | A61G 5/04 | 180/6.48 |
| 6,106,065 A * | 8/2000 | Carroll | A47C 1/0347 | 297/325 |
| 6,126,186 A * | 10/2000 | Mascari | A61G 5/1075 | 280/220 |
| 6,154,690 A * | 11/2000 | Coleman | A61G 5/006 | 180/65.1 |
| 6,203,106 B1 * | 3/2001 | Nearing | A61G 5/107 | 297/284.9 |
| 6,250,409 B1 * | 6/2001 | Wells | A61G 5/061 | 180/6.5 |
| 6,270,111 B1 * | 8/2001 | Hanson | B62B 7/14 | 280/650 |
| 6,319,215 B1 * | 11/2001 | Manor | A61H 9/0078 | 601/148 |
| 6,409,265 B1 * | 6/2002 | Koerlin | A61G 5/006 | 297/325 |
| 6,425,635 B1 * | 7/2002 | Pulver | A61G 5/107 | 297/325 |
| 6,516,480 B2 * | 2/2003 | Elliott | A47C 20/041 | 5/613 |
| 7,007,965 B2 * | 3/2006 | Bernatsky | A61G 5/12 | 280/304.1 |
| 7,273,255 B2 * | 9/2007 | Nylander | A61G 5/1059 | 297/330 |
| 8,061,755 B2 * | 11/2011 | Brendel | B60N 2/1846 | 296/65.15 |
| 8,235,407 B2 * | 8/2012 | Cerreto | A61G 5/1075 | 280/250.1 |
| 8,328,215 B2 * | 12/2012 | Knopf | A61G 5/0866 | 280/250.1 |
| 8,474,848 B2 * | 7/2013 | Bernatsky | A61G 5/1075 | 280/250.1 |
| 8,646,795 B2 * | 2/2014 | Cerreto | B60N 2/22 | 280/250.1 |
| 8,789,628 B2 | 7/2014 | Swenson | | |
| 8,944,454 B2 * | 2/2015 | Blauch | A61G 5/1075 | 280/304.1 |
| 9,095,484 B1 * | 8/2015 | Bethea | A61G 5/128 | |
| 9,221,505 B1 * | 12/2015 | Gonzalez | B62D 55/32 | |
| 9,289,338 B1 * | 3/2016 | Swenson | A61G 5/14 | |
| 9,408,763 B2 * | 8/2016 | Purdue | A61G 5/125 | |
| 10,052,247 B2 * | 8/2018 | Vereen, III | A61G 5/107 | |
| 10,167,083 B2 * | 1/2019 | Henshaw | B64D 11/064 | |
| 10,285,883 B2 * | 5/2019 | Miller | A61G 5/1059 | |
| 10,500,112 B1 * | 12/2019 | Hanson | A61G 5/1056 | |
| 10,548,399 B2 * | 2/2020 | Humphreys | A47C 3/027 | |
| 2001/0056250 A1 * | 12/2001 | Manor | A61H 1/0266 | 601/149 |
| 2002/0133106 A1 * | 9/2002 | Peled | A61H 1/0237 | 601/149 |
| 2005/0040626 A1 * | 2/2005 | Papac | A61G 5/12 | 280/647 |
| 2005/0151360 A1 * | 7/2005 | Bertrand | F16F 9/535 | 280/755 |
| 2008/0222809 A1 * | 9/2008 | Okell | A47G 9/068 | 5/502 |
| 2010/0133018 A1 * | 6/2010 | Hertema | B60G 17/0272 | 180/6.48 |
| 2011/0011652 A1 * | 1/2011 | Swenson | B62D 55/075 | 180/9.23 |
| 2012/0326473 A1 * | 12/2012 | Salvan | A61G 5/10 | 297/180.1 |
| 2014/0246841 A1 * | 9/2014 | Slagerman | A61G 5/107 | 280/220 |
| 2016/0184150 A1 * | 6/2016 | Kennedy | B62D 55/02 | 180/6.5 |
| 2017/0273840 A1 * | 9/2017 | Melgarejo | A61G 5/1075 | |
| 2019/0167498 A1 * | 6/2019 | Parker | A61G 5/08 | |
| 2019/0291793 A1 * | 9/2019 | Johnson | A61G 5/10 | |
| 2020/0069487 A1 * | 3/2020 | Shea | A61G 5/107 | |

* cited by examiner

TRACKED CHAIR

FIELD OF THE INVENTION

This invention relates generally to a mobility device and in particular, to a tracked chair.

BACKGROUND OF THE INVENTION

Throughout this specification, the terms "disabled" and "disabled persons" are used to describe those with limited or no use of lower extremities making unsupported walking or running difficult or impossible.

Wheelchairs have been used for centuries to give the disabled mobility. Traditionally they utilize a combination of a seat, a back, armrests, wheels, and a propulsion system. Although efforts have been made to add stabilizing features to permit travel over uneven surfaces, wheelchair use has largely been limited to generally flat surfaces.

In modern society perceived limitations of the physically disabled have been greatly expanded. Today there are, for example, wheelchair basketball leagues and track and field events. Whereas in generations past mobility impaired individuals have led sedentary lives, today disabilities are viewed not as a prohibition to activity but merely an obstacle to be overcome.

For those disabled individuals who enjoy nature, for example woodlands, traditional wheelchair designs have proved to be unacceptable. There have been some attempts to provide tracked chairs but current tracked designs have proven to be unstable when traversing sufficiently uneven terrain.

Accordingly, there is still a continuing need for improved tracked chair designs. The present invention fulfills this need and further provides related advantages.

BRIEF SUMMARY OF THE INVENTION

The tracked chair described below presents a novel track geometry that provides increased stability when traversing uneven terrain.

A side drive assembly comprises a powered sprocket, a forward non-powered two wheel bogey, and a rearward non-powered two wheel bogey. Each bogey has a respective pivot member pivotally fastened at a first pivot member end between the first and second bogey wheels, and a second pivot member end fastened to the frame such that the forward and rearward bogey each pivot independently from one another around its respective pivot member. The geometry of the drive assembly creates a non-isosceles shaped triangular appearance (no two sides are of equal length), critical to the patentably improved stability of the tracked chair.

Other features and advantages of the tracked chair will be apparent from the following more detailed description of the preferred embodiments, taken in conjunction with the accompanying drawings which illustrate, by way of example, the principles of the invention.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

DETAILED DESCRIPTION OF THE INVENTION

Figure 1:
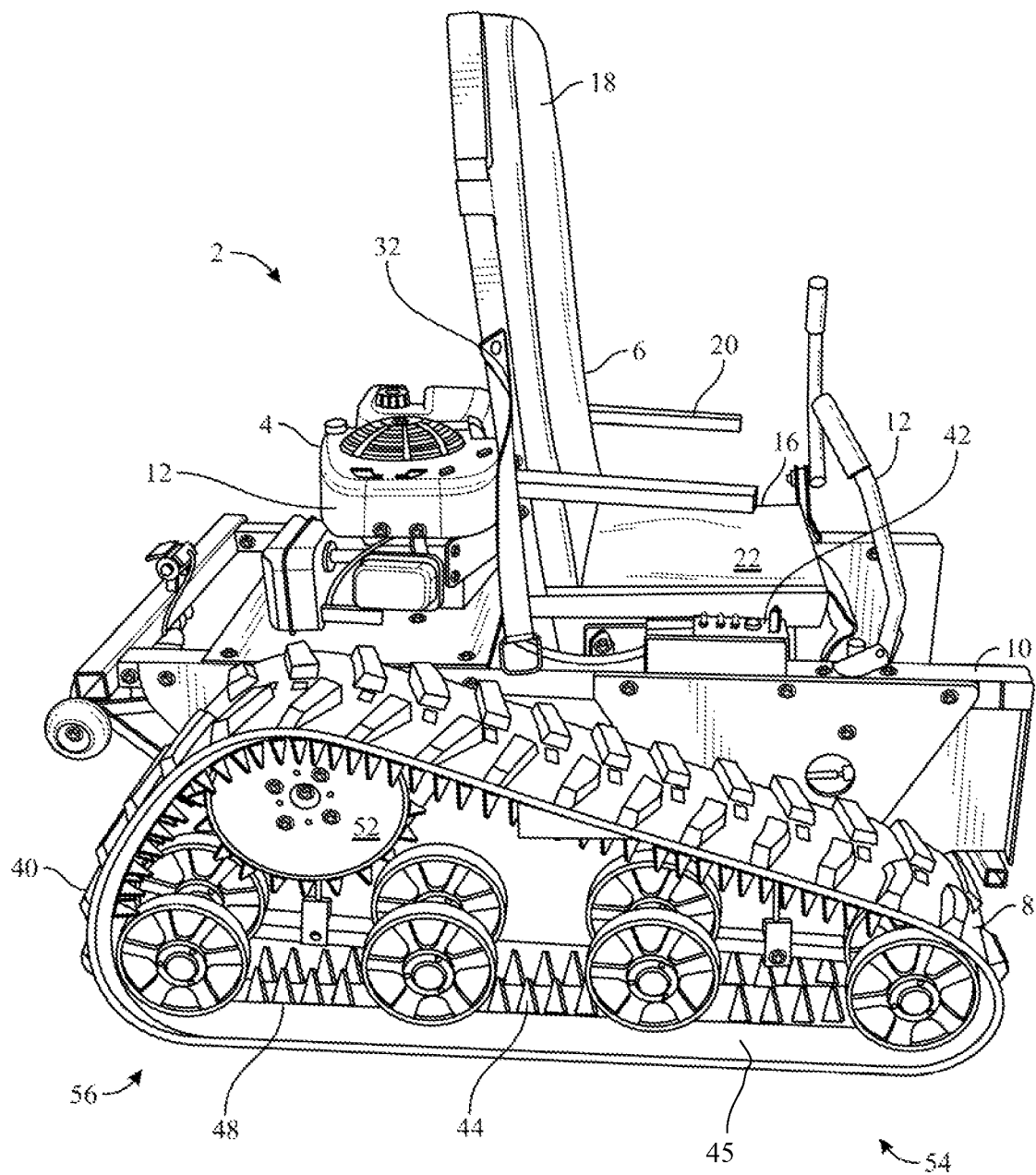
FIG. 1 is a perspective right side view.
Figure 2:
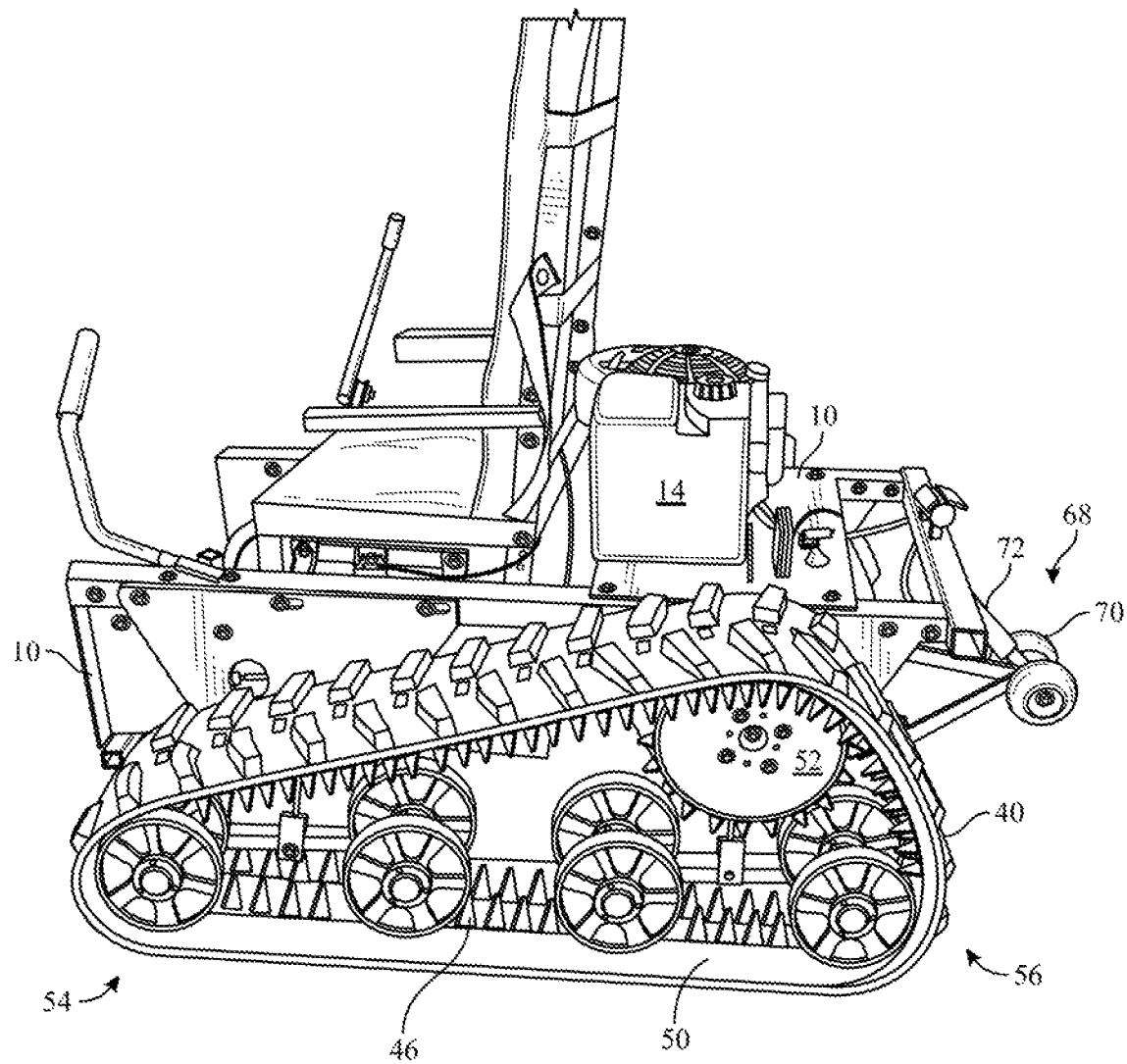
FIG. 2 is a perspective left side view.
Figure 3:
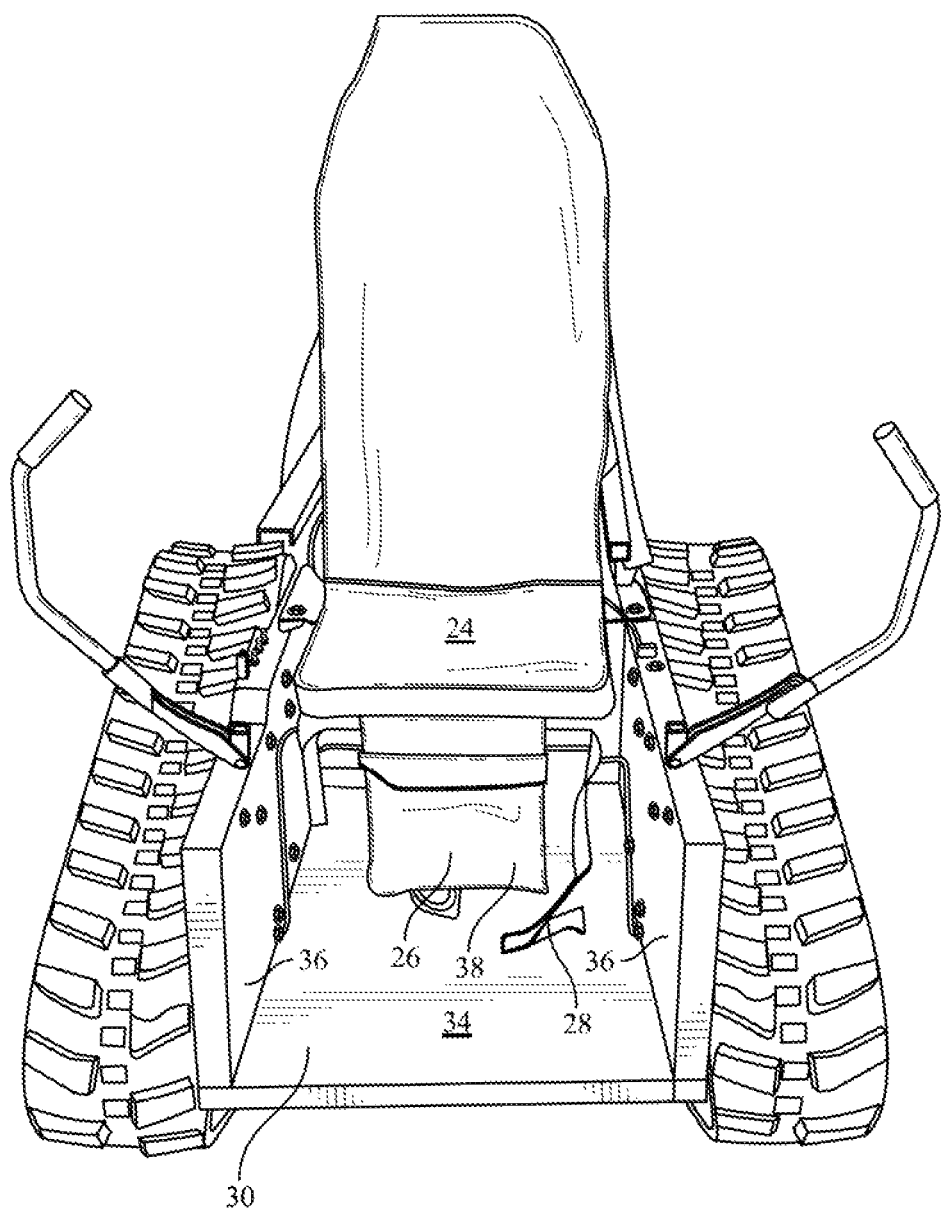
FIG. 3 is a front view.
Figure 4:
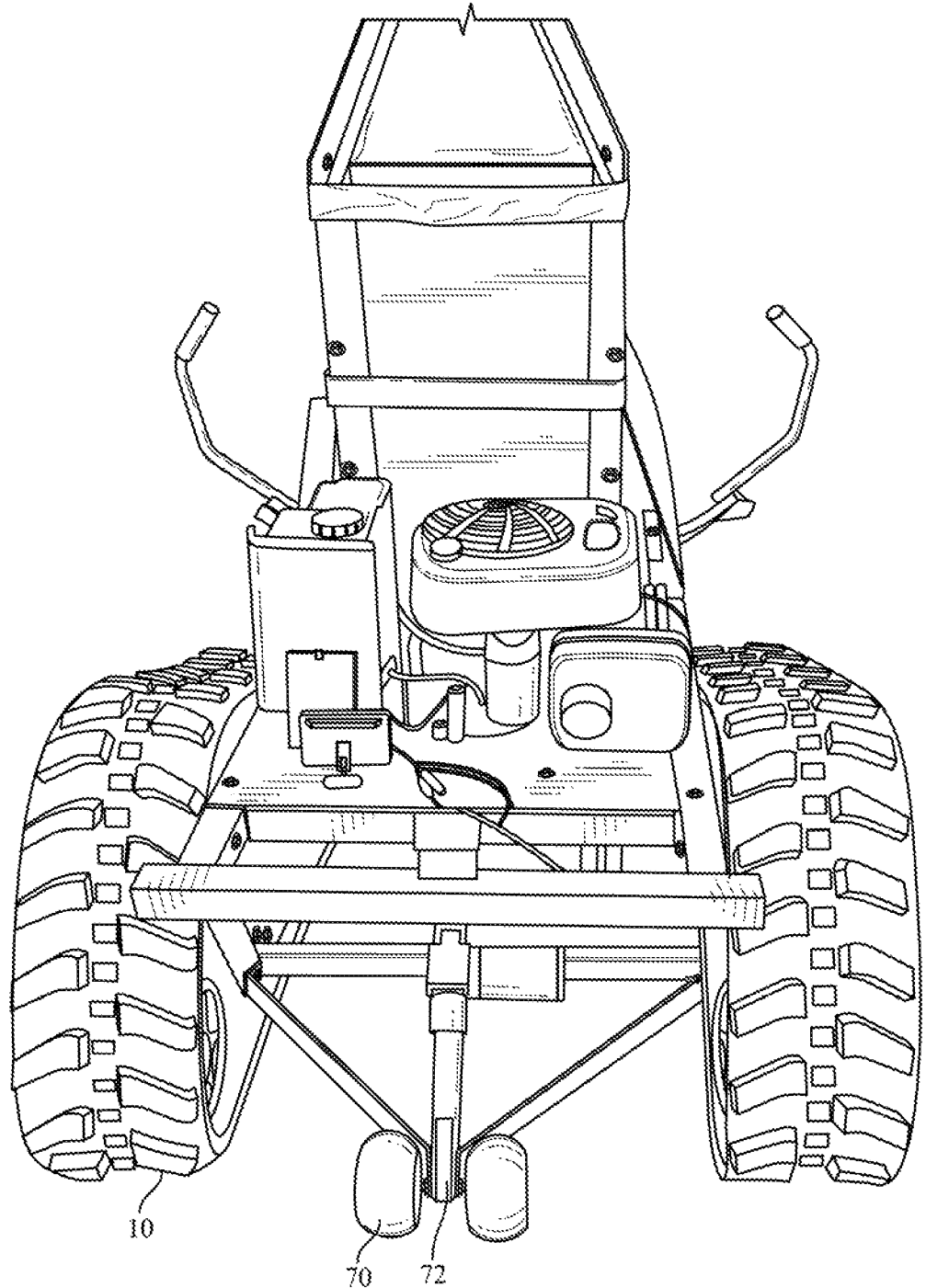
FIG. 4 is a rear view.

As required, detailed embodiments of the present invention are disclosed; however, it is to be understood that the disclosed embodiments are merely exemplary of the invention that may be embodied in various forms. The figures are not necessarily to scale, and some features may be exaggerated to show details of particular components. Therefore, specific structural and functional details disclosed are not to be interpreted as limiting, but merely as a basis for the claims and as a representative basis for teaching one skilled in the art to variously employ the present invention. Where possible, like reference numerals have been used to refer to like parts in the several alternative embodiments of the present invention described herein.

Turning now to the figures, the tracked chair 2 comprises a motor assembly 4, a movable seating assembly 6, a propulsion assembly 8, a frame 10 and a steering assembly 12.

The motor assembly 4 which is fixed to the frame 10 comprises a motor 12 and a fuel/power source 14, for example, gas, diesel, or electric, preferably located behind the seating assembly 6.

The seating assembly 6 which is movably fixed to the frame 10 is positioned above the propulsion assembly 8 and comprises a seat portion 16, a back portion 18, and preferably, arm rests 20. The arm rests 20 are optionally removable, preferably removable without the need to disassemble or remove mounting hardware.

The seating assembly 6 translates forward and rearward, preferably in an arcuate movement, to allow for easier access to the seating assembly 6. The back portion 18 is adjustable in height to achieve optimal support and left and right viewing.

The seat portion 16 comprises a seat cushion 22 preferably having a removable pad 24, one or more seat pockets 26, and is rotatable to permit sitting on either the top or bottom surface. A first restraint 28, for example, a first strap, is attached to the seating assembly 6 to maintain a disabled operator's legs together within a seating assembly cab portion 30. A second restraint 32, for example, a chest belt, is fixed to the seating assembly 6 to maintain a disabled operator upright within the seating assembly 6.

The cab portion 30 comprises a protective area that surrounds the operator's lower extremities to prevent surrounding trees, brush and the like from contacting the extremities. In a preferred embodiment the cab portion 30 comprises a cab floor 34 and two opposing cab sides 36.

Further affixed to the seating assembly 6 is an operator feet engagement member 38 located within the cab portion 30, for example, a front feet pocket. In this manner the first strap 28, the chest belt 32, and the front feet pocket 38 allow a disabled operator to maintain a safe and protected operating position within the seating assembly 6.

In its most forward arcuate position a portion of the seating assembly 6 is in front of a propulsion member 40, for example tracks described in detail below, to allow for unobstructed transfer of a disabled operator from, for example a wheel chair (not show) to the seating assembly 6. In this manner there is no need for a pivoting seat.

Turning now to the propulsion assembly 8, the propulsion assembly 8 comprises a motor control assembly 42, a first side 44 and a second side 46 drive assembly, and a respective first side 48 and second side 50 propulsion member, for example, a sprocket receiving track. The motor control assembly 42 is operatively connected to and controls the motor assembly 4. A propulsion assembly contact section 45 is in direct contact with the ground.

The motor assembly 4 is operatively connected to the first side 44 and second side 46 drive assemblies which are operatively connected to the respective first side 48 and second side 50 propulsion member, for example, a first side and second side sprocket receiving track. The seating assembly 6 is located between the vertical plane of the first side track 48 and the vertical plane of the second side track 50.

Operation of the first side 44 and second side 46 drive assemblies and their respective first side 48 and second side 50 propulsion members are identical. Therefore, only one side will be described, but it is to be understood the other side operates in the same manner.

Each side drive assembly 44, 46 comprises a powered sprocket 52, a forward non-powered pivoting bogey wheel set 54, and a rearward non-powered pivoting bogey wheel set 56, also referred to as a truck. Preferably, each bogey wheel set 54, 56 comprises two wheels 62, 64 and has a respective pivot member 58 pivotally fastened at a first pivot member end 60 between the first 62 and second 64 bogey wheels, and a second pivot member end 66 fastened to the frame 10 such that the forward 54 and rearward 56 bogey wheel sets each pivot independently from one another around its respective pivot member 58. At least one bogey wheel set, preferably the forward bogey wheel set 54, is fixably translatable to adjust track tension.

Figure 5:
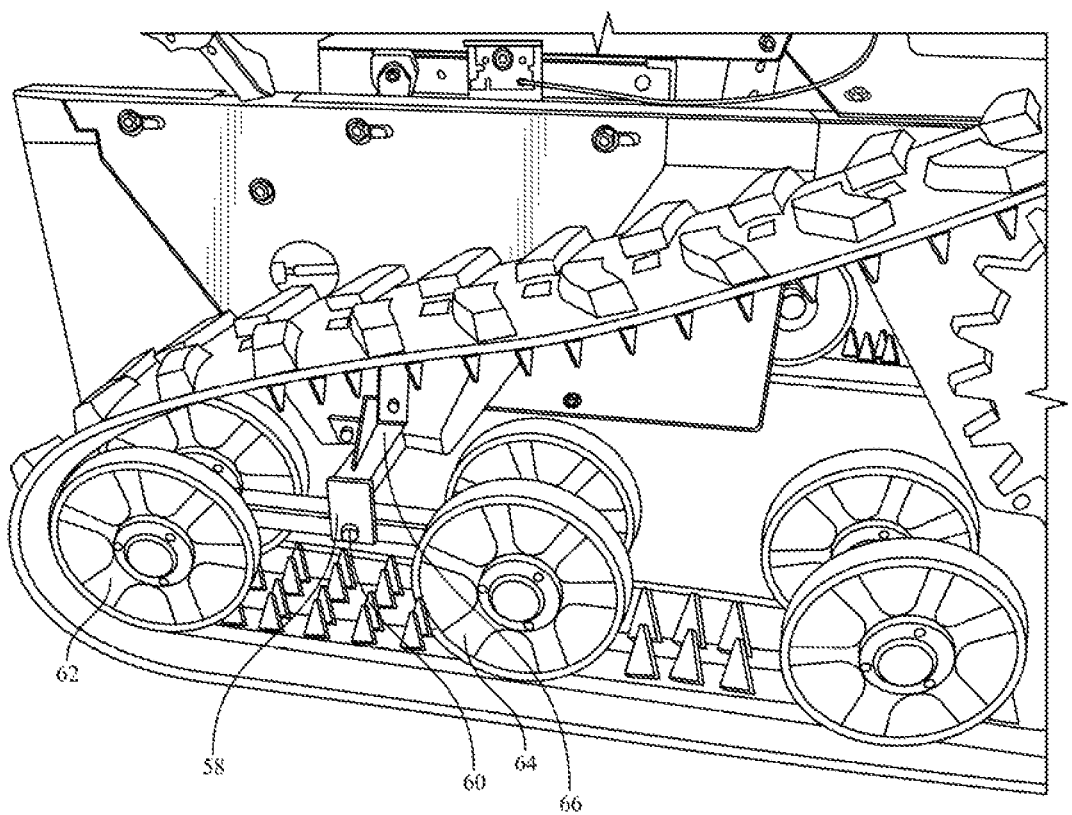
FIGS. 5 and 6 are enlarged views of the propulsion assembly.
Figure 6:
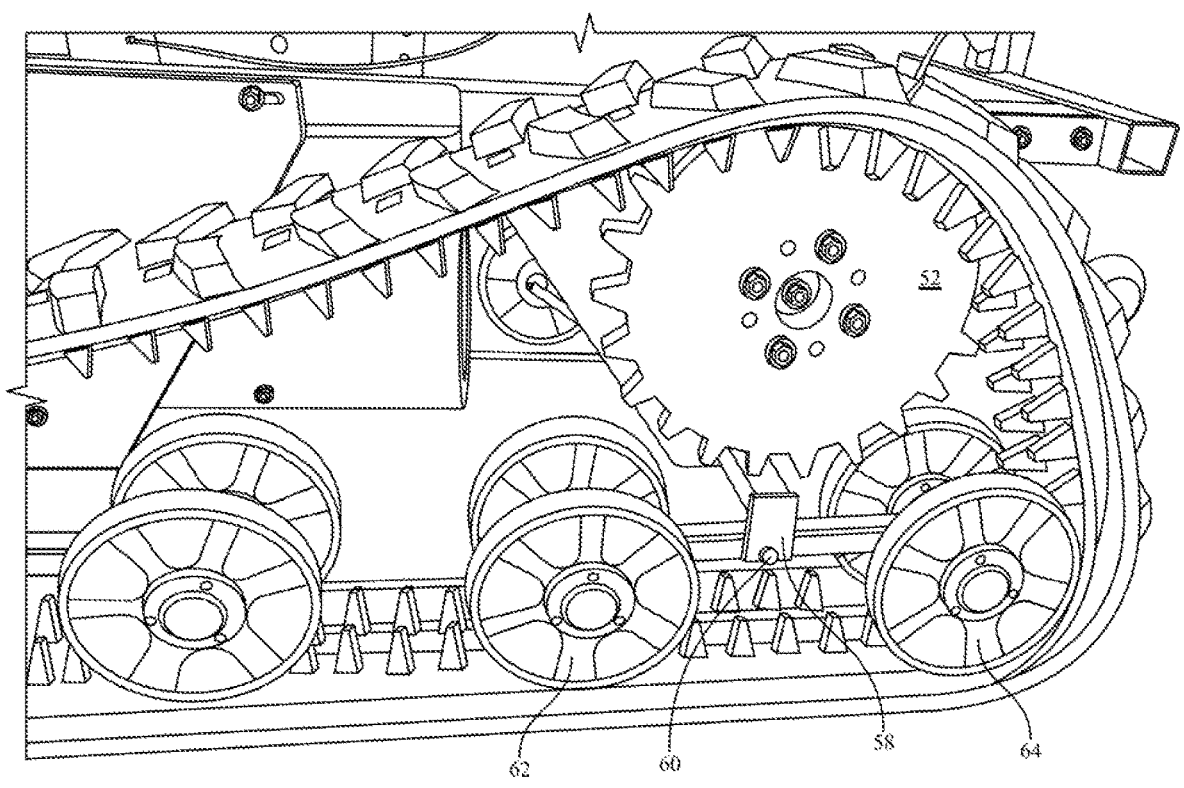

The bogey wheel sets 54, 56 are limited in their pivot travel as a safety measure. Preferably, this pivot travel limit is created by a pivot member pivot stop, for example, the second pivot member end 66 (FIG. 5). As an additional safety measure, the track is operable only when the seat is in an operating position. When the seat is not in an operating position, for example, when moved forward for operator loading, a brake is automatically engaged and locks the tracks. Additionally, the seat comprises an actuator that will not allow the motor to start or run if the seat is not weighted.

The powered sprocket 52 is rotatively connected to the frame 10 and powered by the motor assembly 4. Critically, the powered sprocket 52 is positioned above the rearward non-powered bogey wheel set 56, preferably generally directly above the rearward pivot member 58, and all wheels of the bogey wheel sets 54, 56 rest on the ground.

The propulsion member 40, for example, a sprocket receiving track, circumferentially encases the drive assembly 44, 46. The geometry of the drive assembly 44, 46 creates a non-isosceles shaped triangular appearance (no two sides are of equal length), critical to the patentably improved operation of the tracked chair.

The steering assembly 12 is operatively connected to the propulsion assembly 8 in a known manner.

An anti-sway bracket and axle support (not shown) are fixed in a known fashion. An optional stabilizer, for example, a skid wheel assembly 68 is fastened to the rear of the frame 10. The skid wheel assembly 68 comprises, for example, at least one skid wheel 70 connected by a piston 72 to the frame 10.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A tracked chair comprising:
   a motor assembly attached to a frame, the frame comprising a cab portion for surrounding an occupant's legs;
   a movable seating assembly attached to the frame;
   a propulsion assembly operatively connected to the motor assembly; and
   a steering assembly operatively connected to the propulsion assembly;
   wherein the propulsion assembly comprises a powered sprocket; a forward non-powered pivoting bogey wheel set comprising a respective pivot member: and a rearward non-powered pivoting bogey wheel set comprising a respective pivot member: the powered sprocket positioned above the rearward non-powered bogey wheel set; and all wheels of the bogeys rest on a propulsion assembly contact section;
   wherein the seating assembly non-pivotally translates forward and rearward in an arcuate movement; and
   wherein a portion of the seating assembly non-pivotally translates in front of the propulsion assembly.

2. The tracked chair of claim 1 wherein the seating assembly comprises a first restraint for maintaining an operator's legs together within the cab portion, and a second restraint for maintaining an operator upright.

3. The tracked chair of claim 2 further comprising an operator feet engagement member located within the cab portion.

4. The tracked chair of claim 3 wherein the operator feet engagement member comprises a front feet pocket.

5. The tracked chair of claim 1 wherein the propulsion assembly comprises a motor control assembly operatively connected to and controlling the motor assembly; a first side and second side drive assembly; and a respective first side and second side propulsion member.

6. The tracked chair of claim 5 wherein the first side and second side propulsion member are each a sprocket receiving track.

7. The tracked chair of claim 6 wherein the motor assembly is operatively connected to the first side and second side drive assemblies which are operatively connected to the respective first side and second side sprocket receiving track; and the seating assembly is located between a vertical plane of the first side track and a vertical plane of the second side track.

8. The tracked chair of claim 3 wherein the forward and rearward bogey wheel sets each pivot independently from one another around the respective pivot members; the respective pivot members are pivotally fastened at a first end between respective bogey wheels of the forward and rearward bogey wheel sets and at a second end to the frame; and at least one of the forward and rearward bogey wheel sets is fixably translatable to adjust a track tension.

9. The tracked chair of claim 1 wherein the forward non-powered pivoting bogey wheel set and the rearward non-powered pivoting bogey wheel set each comprise two wheels.

10. The tracked chair of claim 9 wherein each bogey wheel set further comprises a pivot member pivot stop.

11. The tracked chair of claim 8 wherein the powered sprocket is positioned above the rearward bogey wheel set pivot member.

12. The tracked chair of claim 5 wherein the geometry of each drive assembly is a triangular shaped appearance having no two sides of equal length.

13. The tracked chair of claim 1 further comprising a stabilizer.

14. The tracked chair of claim 13 wherein the stabilizer comprises a skid wheel assembly fastened to a rear end of the frame.

15. A tracked chair comprising:
- a motor assembly attached to a frame, the frame comprising a cab portion for surrounding an occupant's legs;
- a movable seating assembly that non-pivotally translates forward and rearward in an arcuate movement, the seating assembly is attached to the frame and comprises a first restraint for maintaining an operator's legs together within the cab portion, and a second restraint for maintaining an operator upright, and wherein a portion of the seating assembly non-pivotally translates in front of a propulsion member;
- a propulsion assembly operatively connected to the motor assembly;
- a steering assembly operatively connected to the propulsion assembly; and a stabilizer comprising a skid wheel assembly fasted to a rear end of the frame;
- wherein, the propulsion assembly comprises a powered sprocket; a forward non-powered pivoting bogey two wheel set comprising a respective pivot member; and a rearward non-powered pivoting bogey two wheel set comprising a respective pivot member; the powered sprocket positioned above the rearward non-powered bogey two wheel set; and all four wheels of the bogey two wheel sets rest on a propulsion assembly contact section.

16. The tracked chair of claim 15 further comprising a front feet pocket located within the cab portion.

17. The tracked chair of claim 15 wherein the propulsion assembly comprises a motor control assembly operatively connected to and controlling the motor assembly; a first side and second side drive assembly; and a respective first side and second side sprocket receiving track.

18. The tracked chair of claim 17 wherein the motor assembly is operatively connected to the first side and second side drive assemblies which are operatively connected to the respective first side and second side sprocket receiving track; and the seating assembly is located between a vertical plane of the first side track and a vertical plane of the second side track; and the forward and rearward bogey two wheel sets each pivot independently from one another around the respective pivot members, the respective pivot members are pivotally fastened at a first end between respective bogey wheels of the forward and rearward bogey two wheel sets and at a second end to the frame; at least one of the forward and rearward bogey two wheel sets is fixably translatable to adjust a track tension; each of the forward and rearward bogey two wheel sets further comprise a pivot member pivot stop; the powered sprocket is positioned above the rearward bogey two wheel set pivot member; and the geometry of each drive assembly is a triangular shaped appearance having no two sides of equal length.

* * * * *